(No Model.)

D. D. JONES.
FRUIT DIPPING APPARATUS.

No. 439,072. Patented Oct. 21, 1890.

Witnesses
Geo. H. Strong
J. H. Nourse

Inventor,
David D. Jones
by Dewey & Co.
Atty

UNITED STATES PATENT OFFICE.

DAVID D. JONES, OF SAN JOSÉ, CALIFORNIA, ASSIGNOR TO W. C. ANDERSON, OF SAME PLACE.

FRUIT-DIPPING APPARATUS.

SPECIFICATION forming part of Letters Patent No. 439,072, dated October 21, 1890.

Application filed February 10, 1890. Serial No. 339,887. (No model.)

*To all whom it may concern:*

Be it known that I, DAVID D. JONES, a citizen of Great Britain, residing at San José, Santa Clara county, State of California, have invented an Improvement in Fruit-Dipping Apparatus; and I hereby declare the following to be a full, clear, and exact description of the same.

My invention relates to the general class of fruit-handling apparatus, and especially to that sub-class of devices which is intended and adapted for the dipping of fruit, an operation especially called for in the case of prunes, which previous to drying are dipped into lye-water, so as to cut or crack their skins, being afterward dipped into clear water to wash them and then carried off and spread to dry.

My invention consists in the novel construction and arrangement of apparatus hereinafter fully described, and specifically pointed out in the claims.

The object of my invention is to provide a simple, readily operative, and effective apparatus for this purpose.

Figure 1:
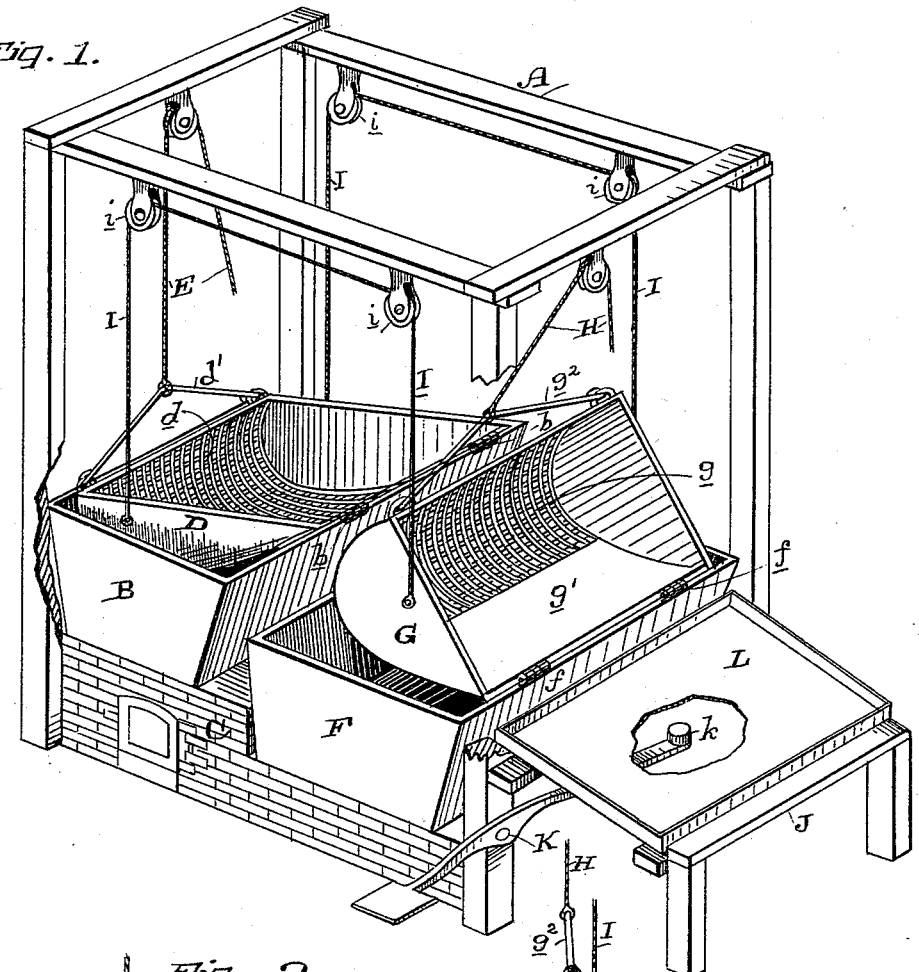
Figure 2:
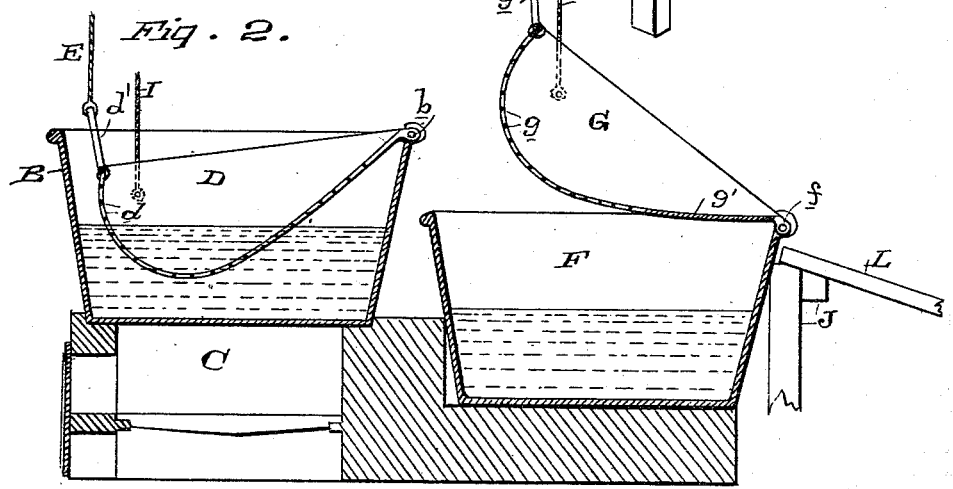

Referring to the accompanying drawings for a more complete explanation of my invention, Figure 1 is a perspective view of my apparatus. Fig. 2 is a cross-section of the two tanks and dipper.

A represents generally the frame of the apparatus.

B is a tank for the lye-water, said tank being suitably mounted over a heating or fire chamber C, which represents one means of keeping the lye-water within the tank warm, as is necessary.

Operating within the tank B is a dipper D. This consists of a vessel having ends and a curved bottom which is partially or wholly perforated, as shown at $d$, the perforations being of any suitable character, here shown as formed by the meshes of a wire screen. The dipper D is hinged at its forward edge to the forward edge of the tank B, as is shown at $b$, whereby it may be raised up from and lowered down into the lye-water within the tank. This movement of the dipper may be accomplished by means of the pull-rope E, which is secured to the dipper by means of the bail $d'$.

F is a second tank lower than the first, and is for the purpose of containing clear water. Within this tank is adapted to operate the second dipper G, which has a shape generally corresponding to the first, and is made with a perforated or foraminous bottom $g$, which is preferably only a part of the whole bottom, leaving the forward portion represented by $g'$ smooth. This dipper is hinged at $f$ to the forward edge of the tank F, and may be raised up and down by means of the pull-rope H, which is connected with the dipper by the bail $g^2$.

The two dippers D and G are connected together by the ropes or cords I, one at each side. These ropes or cords have one end attached to one dipper, and thence pass upwardly over guide-blocks $i$ and down to the other dipper, to which their other ends are secured. The length of these ropes or cords and their arrangement are such that when one dipper is down the other dipper is raised, and vice versa.

J is an inclined frame-work or table at the foot of the machine, having secured to it at one side the pivoted treadle-lever K, the inner end of which has a knocker $k$.

Upon the inclined frame J is to be freely laid the fruit-tray L in such a position that the knocker $k$ rests directly under it.

The operation of the apparatus is as follows: The lye-water in tank B is kept at a suitable temperature by the heat from chamber C, while clear water is placed in tank F. The prunes from their boxes are directly dumped into the first dipper D, which by its own weight and being relieved of the cord E swings down into the lye-water in tank B, so that said water, rising through the perforated bottom $d$ of the dipper, encompasses the prunes and cuts them. The prunes are held well together within the dipper, none of them floating or getting out, so that the lye-water remains pure. As soon as the prunes have been sufficiently cut the rope E is pulled upon, and the dipper D is raised, so that its bottom tips forwardly and downwardly. This raising of the dipper D, acting through the slacking of the cords I, allows the dipper G to descend by its own weight into the cold-water tank F and places said dipper in a position to receive the prunes from the elevated dipper D. The prunes now pass by gravity into the dipper G and are washed off in the clear water rising through its perforated bottom. Thereupon a second charge of prunes is delivered to the dipper D, which, descending as before into the lye-water, acts through the cords or ropes I to raise the dipper G out of the tank F. The dipper G is not raised to a dumping or discharging position at first, but only to an approximately horizontal position out of the water, thereby allowing the prunes to fully drain. After they have drained for a moment the rope H is pulled upon, thereby tilting the dipper G more and allowing the prunes to easily roll off over the smooth portion g' of the dipper onto the tray L. As they roll over said tray the operator by means of his foot imparts a rapid vibratory motion to the lever K, the knocker k of which, striking under the tray, so agitates its surface as to cause the prunes to spread out evenly over said tray. When the tray is full, it is removed and another one substituted. The dippers, being connected with the tank by a fulcrum or pivot, can be large as required and yet easily raised up and down.

Having thus described my invention, what I claim as new, and desire to secure by Letters Patent, is—

1. In a fruit-dipping apparatus, the combination of the tanks B and F for the liquids, the swinging dipper D in the tank B, and the swinging dipper G, operating in the tank F and operating simultaneously with the dipper D, but in a direction opposite thereto, for receiving the fruit from the dipper D, substantially as herein described.

2. In a fruit-dipping apparatus, the separate tanks for the liquids, in combination with the swinging dipper in the first tank, the swinging dipper in the second tank, adapted to receive the fruit from the first dipper, and connections between said dippers, whereby they dip and rise alternately, substantially as herein described.

3. In a fruit-dipping apparatus, the separate tanks for the liquids, in combination with the swinging dipper in the first tank, the swinging dipper in the second tank and arranged to receive the fruit from the first dipper, and the cords or ropes I, connecting said dippers, whereby they dip and rise alternately, substantially as herein described.

4. In a fruit-dipping apparatus, the combination of a tank for liquid and a swinging dipper in said tank and adapted to contain the fruit, a second liquid tank and a swinging dipper therein adapted to receive the fruit from the first dipper and to rise and fall alternately with said first dipper, and a tray at the base of the second dipper for receiving the fruit therefrom, substantially as described.

5. In a fruit-dipping apparatus, the tanks B and F and the swinging dippers D and G therein, in combination with the ropes I, connecting said dippers, whereby they dip and rise alternately, the rope H for tilting the dipper G to discharge its fruit, the receiving-tray L, and the vibrating knocker under said tray, substantially as herein described.

6. An apparatus for dipping fruit, comprising the tank B for the lye-water, the tank F for the clear water, the perforated dipper D, hinged to and operating within the tank B, the perforated dipper G, hinged to and operating within the tank F, the cords or ropes I, connecting the dippers, whereby they dip and rise alternately, the pull-rope E for raising the dipper D, the pull-rope H for raising the dipper G, the receiving-tray L, and the vibrating knocker k, all arranged and adapted to operate substantially as herein described.

In witness whereof I have hereunto set my hand.

DAVID D. JONES.

Witnesses:
ALBERT A. DREW,
JAMES B. CAPP.